(12) United States Patent
Innocente et al.

(10) Patent No.: US 8,967,603 B2
(45) Date of Patent: Mar. 3, 2015

(54) MAGNETIC DEVICE FOR GRIPPING AND CLAMPING A WORKPIECE IN A MACHINING UNIT OR MACHINING LINE

(75) Inventors: Daniela Innocente, Orbassano (IT); Anja Herrmann, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 13/500,566

(22) PCT Filed: Nov. 7, 2011

(86) PCT No.: PCT/IB2011/054957
§ 371 (c)(1),
(2), (4) Date: Apr. 5, 2012

(87) PCT Pub. No.: WO2012/120342
PCT Pub. Date: Sep. 13, 2012

(65) Prior Publication Data
US 2014/0008853 A1    Jan. 9, 2014

(30) Foreign Application Priority Data
Mar. 7, 2011 (EP) ................................. 11157202

(51) Int. Cl.
*B25B 11/00* (2006.01)
*B23Q 3/00* (2006.01)
(Continued)

(52) U.S. Cl.
CPC .............. *B23Q 3/1546* (2013.01); *B23Q 3/154* (2013.01)
USPC ............................ 269/8; 269/289 R; 335/289

(58) Field of Classification Search
CPC ...................................................... B23Q 3/1546
USPC .................................................. 269/8, 289 R
See application file for complete search history.

(56) References Cited

U.S. PATENT DOCUMENTS 1,125,198 A * 1/1915 Spencer .......................... 335/289
1,199,947 A * 10/1916 Walker et al. .................. 335/288
(Continued)

FOREIGN PATENT DOCUMENTS

EP       0211329 A1    2/1987
EP       0254939 A1    2/1988
(Continued)

OTHER PUBLICATIONS

International Search Report and Written Opinion for corresponding PCT application No. PCT/IB2011/054957, mailed on Jan. 25, 2012.

*Primary Examiner* — Alvin Grant
(74) *Attorney, Agent, or Firm* — Heslin Rothenberg Farley & Mesiti P.C.; Victor A. Cardona, Esq.

(57) ABSTRACT

A magnetic device for gripping and clamping a workpiece in a machining unit or on a machining line including a magnetic plate having a distribution of high-energy permanent-magnet modules, which can be electrically activated. An auxiliary workpiece-holder plate made of ferromagnetic material rests on a main surface of the magnetic plate and has a top surface shaped in a way complementary to a surface of the workpiece that rests thereon. The workpiece rests on the top surface of the auxiliary workpiece-holder plate only in points corresponding to some supporting pads, while the facing surfaces of the workpiece and auxiliary workpiece-holder plate are kept slightly set apart from one another for most of their extension.

2 Claims, 4 Drawing Sheets

(51) Int. Cl.
*H01F 7/20* (2006.01)
*B23Q 3/154* (2006.01)

(56) References Cited

U.S. PATENT DOCUMENTS

| | | | | | |
|---|---|---|---|---|---|
| 1,212,555 | A | * | 1/1917 | Pragst | 335/288 |
| 2,217,048 | A | * | 10/1940 | Floss | 335/295 |
| 2,319,270 | A | * | 5/1943 | Simmons | 335/295 |
| 2,327,748 | A | * | 8/1943 | Smith | 335/286 |
| 3,572,680 | A | * | 3/1971 | Neff | 269/8 |
| 3,775,717 | A | * | 11/1973 | Braillon | 335/295 |
| 3,837,274 | A | | 9/1974 | Zaccard | |
| 4,777,463 | A | | 10/1988 | Cory | |
| 4,837,540 | A | * | 6/1989 | Michele et al. | 335/286 |
| 6,644,637 | B1 | * | 11/2003 | Shen et al. | 269/152 |
| 7,282,874 | B2 | * | 10/2007 | Shibata et al. | 318/135 |
| 7,319,375 | B2 | * | 1/2008 | Roy | 335/285 |
| 7,793,900 | B2 | * | 9/2010 | Feng et al. | 248/206.5 |
| 7,999,645 | B2 | * | 8/2011 | Sarda | 335/289 |

FOREIGN PATENT DOCUMENTS

| | | |
|---|---|---|
| EP | 0311865 A1 | 4/1989 |
| EP | 0345554 A1 | 12/1989 |
| WO | WO 2009/034425 A2 | 3/2009 |
| WO | WO 2009/130721 A1 | 10/2009 |
| WO | WO 2009/130722 A1 | 10/2009 |
| WO | WO 2010/125592 A1 | 11/2010 |

* cited by examiner

MAGNETIC DEVICE FOR GRIPPING AND CLAMPING A WORKPIECE IN A MACHINING UNIT OR MACHINING LINE

CROSS REFERENCE TO RELATED APPLICATIONS

This application is a national stage of PCT International Application No. PCT/182011/054,957 filed on Nov. 7, 2011, which claims priority to European application number 11157202.0 filed on Mar. 7, 2011, the entire disclosures of which are incorporated herein by reference.

The present invention relates to magnetic devices for gripping and clamping workpieces in a machining unit or on a machining line, of the type comprising a magnetic plate including a distribution of high-energy permanent-magnet modules, which can be electrically activated, said magnetic plate having two plane and opposite main surfaces, giving out onto which are the poles of said permanent-magnet modules.

BACKGROUND OF THE INVENTION

Magnetic plates of the type referred to above are, for example, illustrated in EP-A-0 211 329, EP-A-0 254 939, EP-A-0 311 865, EP-A-0 345 554, WO-A-09/034425, WO-A-09/130721, WO-A-09/130722, and WO-A-10/125592.

Magnetic plates of this type constitute permanent electromagnetic systems in which the electrical energy is used only for a few seconds in the MAG (activation) and DEMAG (deactivation) steps. The magnetic plate has a distribution of permanent-magnet modules arranged according to an orderly array and having their North/South poles oriented alternately to generate a high concentration of force through a grid of multiple magnetic stitches that enable a horizontal and flattened circulation of the magnetic flux. The anchoring force generated enables a workpiece set on the magnetic plate to be withheld irrespective of the direction of the forces to which the workpiece is subject during machining and also when small thicknesses are involved. The force of attraction is uniformly distributed over the entire surface of contact with the workpiece, without any compression and deformation of the workpiece, unlike what occurs with traditional mechanical clamping devices. The magnetic plate leaves the workpiece free except for just the side of contact with the plate, which favours a better exploitation of the machining unit.

A device as set forth in the preamble of claim 1 is known from document U.S. Pat. No. 4,777,463 A.

The object of the present invention is to improve the flexibility of use of magnetic devices of the type referred to above, with simple and low-cost means, in particular guaranteeing the possibility of use also with workpieces of a complex conformation, and without jeopardizing the precision of positioning of the workpiece.

With a view to achieving said purpose, the subject of the invention is a magnetic device for gripping and clamping a workpiece in a machining unit or on a machining line, which has the characteristics of claim 1.

SUMMARY

In the device according to the invention, the aforesaid auxiliary workpiece-holder plate, which is made of ferromagnetic material, is magnetised automatically when the magnetic plate set underneath it is activated so as to carry out clamping of the workpiece-holder plate 8 on the magnetic plate 2 and clamping of the workpiece on the workpiece-holder plate. At the same time, the auxiliary plate functions as adapter, thanks to the conformation of its top surface, which follows the corresponding conformation of the surface of the workpiece. In this way, it is possible to obtain clamping on the magnetic plate of workpieces having a complex shaped surface. Precise referencing in the plane of the magnetic plate between the workpiece and the workpiece-holder plate is obtained via locating pins, whilst positioning in the direction perpendicular to the plane of the magnetic plate is defined in a precise way by the aforesaid supporting pads of the auxiliary plate. Except for said supporting pads, the top surface of the auxiliary workpiece-holder plate is not in contact with the workpiece, but rather is kept slightly set apart therefrom, which prevents in a simple way the risk of an incorrect resting of the workpiece on the workpiece-holder table, without requiring very restricted machining tolerances.

Of course, the invention can be applied with any orientation of the magnetic plate, in particular both with the magnetic plate set horizontally and with the magnetic plate set vertically. In the present description, the terms "top" and "bottom" are used with reference to a horizontal orientation of the magnetic plate, but are not to be interpreted in a limiting sense. For example, in the case of vertical orientation of the magnetic plate, by "top surface" and "bottom surface" of the workpiece-holder plate is to be meant the opposite surfaces of the workpiece-holder plate that are, respectively, furthest from and closest to the magnetic plate.

In the case where a magnetic plate of dimensions larger than those of the auxiliary workpiece-holder plate is used, the device can further comprise a protective shroud and cover, which covers the aforesaid magnetic plate and has a plane top surface, resting on the main top surface of the magnetic plate and having an opening that follows the profile of the base surface of the auxiliary workpiece-holder plate to enable the latter to project through said opening. In this way, the magnetic plate is protected in a simple and efficient way from the swarf produced during machining of the workpiece.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF THE DRAWINGS

Figure 1:
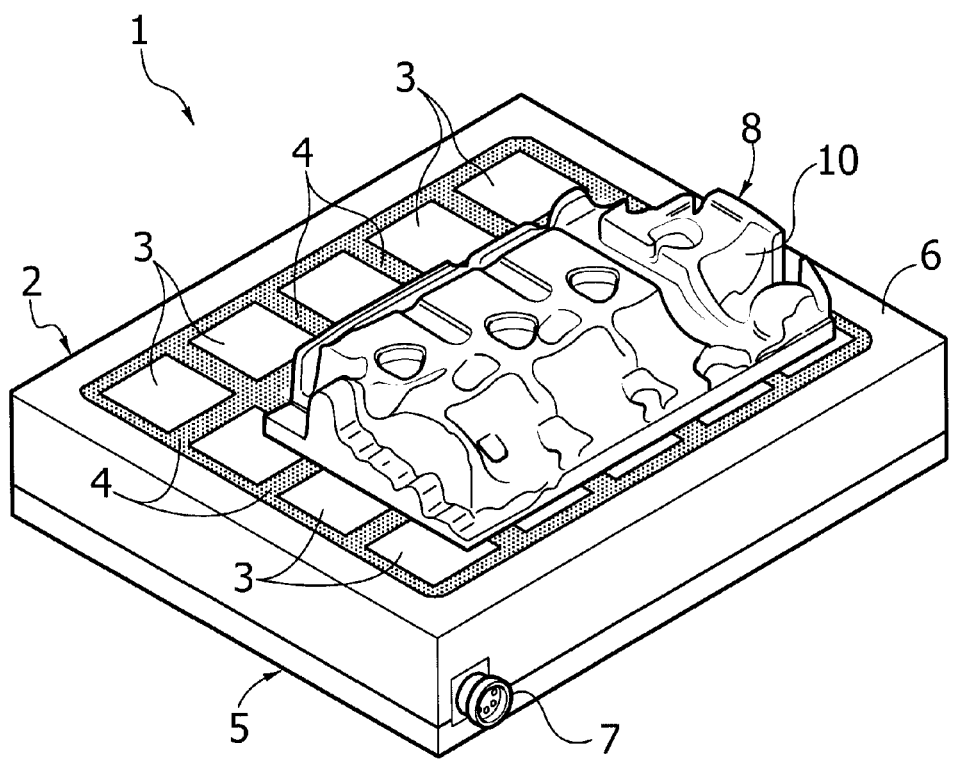
FIG. 1 is a perspective view of an example of embodiment of the device according to the invention.

In the drawings, the number 1 designates as a whole a magnetic device for gripping and clamping a workpiece in a machining unit or on a machining line. The example illustrated here regards the case of a device that is to be used in a machine for machining with removal of stock of an internal-combustion engine block.

The device 1 comprises a magnetic plate 2 of the type already described above, which has, in a way in itself known, an array of permanent-magnet modules 3. The magnetic plate 2 has a main plane base surface 5 and a main top plane surface 6 parallel to the surface 5. The permanent-magnet modules 3 have North/South poles facing the main surfaces 5, 6 and oriented alternately, in a way in itself known, in order to give rise, when activated, to a high concentration of force through a grid of multiple magnetic stitches that enable a horizontal and flattened circulation of the magnetic flux. The magnetic plate 2 is provided, on a lateral surface thereof, with a connector 7 for an electrical-supply cable. According to the technique known in the sector of said magnetic plates, the electrical energy is used only for a few seconds in the step of activation and in the step of deactivation of the permanent magnets.

Figure 4:
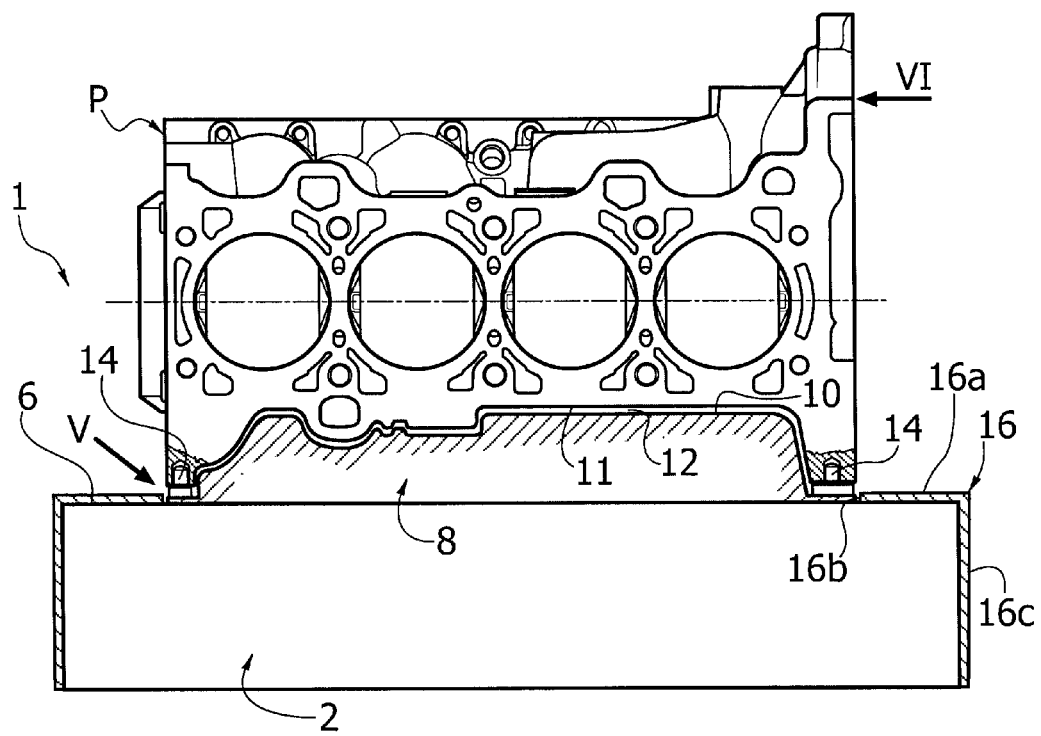
FIG. 4 is a view in elevation, partially sectioned according to the line IV of FIG. 3, which shows a workpiece, specifically an internal-combustion engine block, clamped on the device according to the invention.
Figure 6:
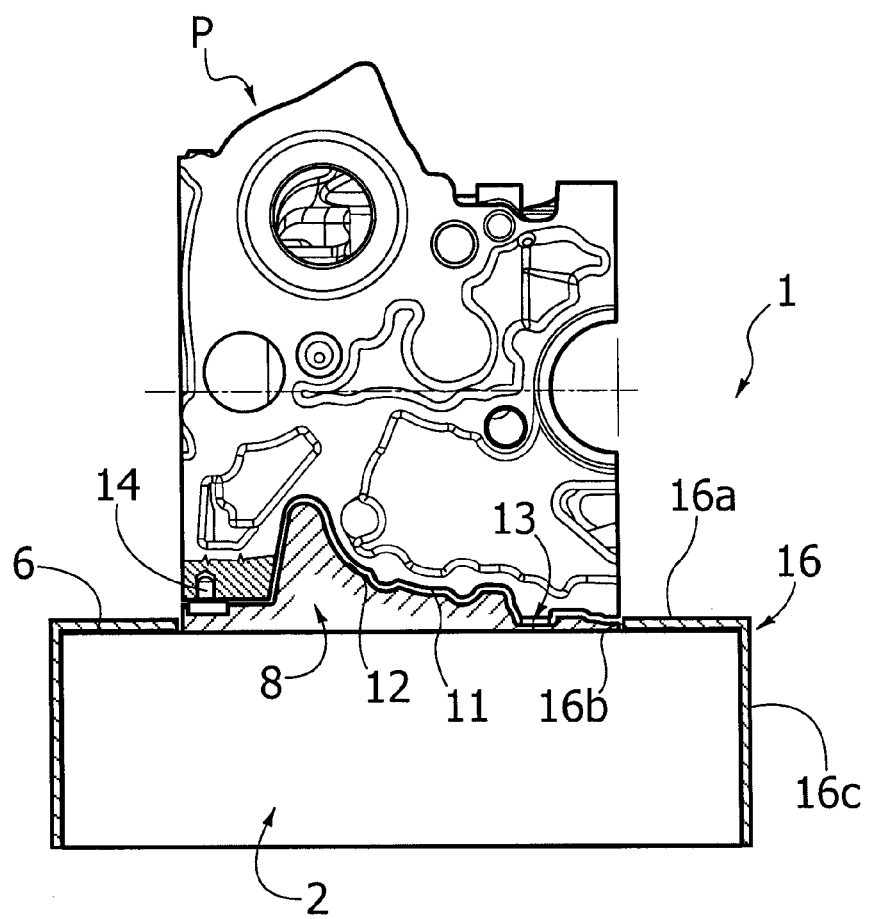
FIG. 6 is a view in elevation, partially sectioned according to the line VI of FIG. 3.

The device according to the invention further comprises an auxiliary workpiece-holder plate 8 made of ferromagnetic material, which in the example illustrated is constituted by a steel casting. The auxiliary workpiece-holder plate 8 has a plane base surface 9, which rests on the main top surface 6 of the magnetic plate 2, and a top surface 10, formed and shaped according to the corresponding conformation of the surface of a workpiece P (in the case illustrated an engine block) that is to rest thereon. FIGS. 4 and 6 of the annexed drawings show the workpiece P resting on the magnetic plate 2 and on the auxiliary workpiece-holder plate 8. As may be clearly seen in FIG. 1, the top surface 10 of the auxiliary workpiece-holder plate 8 is shaped with reliefs and cavities engaging within which are corresponding cavities and reliefs of the surface 11 (FIGS. 4, 6) of the workpiece P that rests on the auxiliary plate 8.

Figure 3:
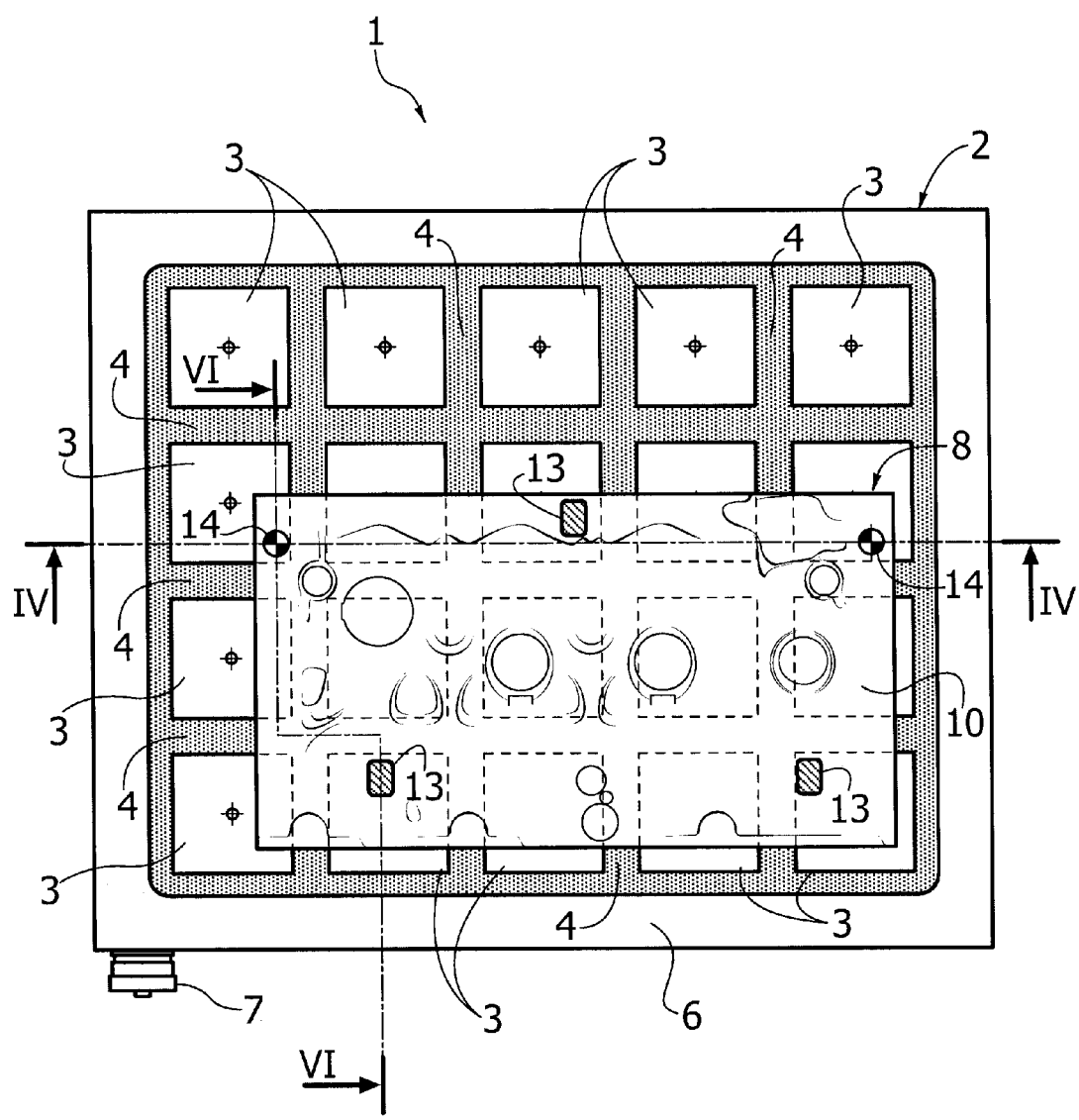
Figure 5:
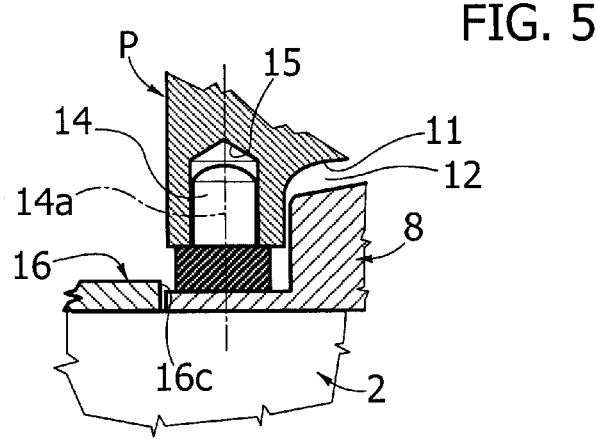
FIG. 5 is a view at an enlarged scale of the detail indicated by the arrow V in FIG. 4.

As may be clearly seen from FIGS. 4 and 6, the top surface 10 of the auxiliary workpiece-holder plate 8 and the surface 11 of the workpiece P that rests thereon remain slightly set apart from one another for most of their extension, creating a gap 12 that prevents the risk of an incorrect coupling of the workpiece P with the auxiliary workpiece-holder plate 8, without requiring the adoption of particularly restricted production tolerances. The workpiece P rests on the auxiliary workpiece-holder plate 8 only in points corresponding to a plurality of supporting pads 13 (see FIG. 3 and FIG. 6), which define in a precise way the vertical position (with reference to the figures) of the workpiece P with respect to the magnetic plate 2 and to the auxiliary workpiece-holder plate 8. The precise positioning of the workpiece P on the auxiliary plate 8 in the plane of the main top surface of the magnetic plate is guaranteed by a pair of locating pins 14 (see FIGS. 3, 4, 6 and the detail of FIG. 5), which project at the top from the auxiliary workpiece-holder plate 8, each with an axis 14a orthogonal to the plane of the main top surface 6 of the magnetic plate 2, and which are received within respective seats 15 made in the workpiece P.

Figure 2:
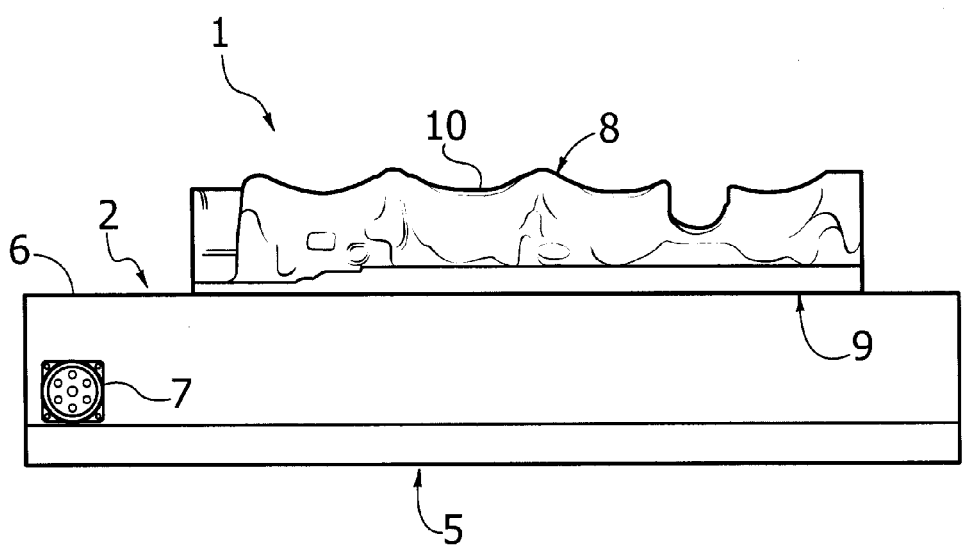
FIGS. 2 and 3 are a side view in elevation and a plan view of the device of FIG. 1.

Preferably, the device 1 further comprises a protective shroud 16, constituted by a metal sheet made of non-ferromagnetic material, for example aluminium, comprising a top plane wall 16a that covers the top main surface 6 of the magnetic plate 2 and that has an opening 16b, the boundary of which follows the profile of the base surface of the auxiliary workpiece-holder plate 8 in such a way that the auxiliary workpiece-holder plate 8 can project through said opening 16b, whilst the remaining part of the magnetic plate 2 remains protected from the swarf that drops thereon during machining. The protective shroud 16 has side walls 16c that cover the side walls of the magnetic plate 2 (the protective shroud 16 is illustrated in cross section in FIGS. 4 and 6, whereas it has been removed in FIGS. 1-3, for convenience of illustration).

As emerges clearly from the foregoing description, the device according to the invention enables exploitation of the magnetic plate 2 for gripping and clamping workpieces having non-plane surfaces. This is obtained in a simple and efficient way by providing the auxiliary workpiece-holder plate 8. Precise referencing in the three orthogonal directions is obtained thanks to the locating pins 14 and to the supporting pads 13, whilst the provision of the gap 12 along the majority of the extension of the facing surfaces of the auxiliary plate 8 and of the workpiece P guarantees proper coupling of the workpiece P to the plate 8, without requiring adoption of restricted production tolerances throughout the extension of the coupling surfaces of the workpiece P and of the auxiliary workpiece-holder plate 8.

In use, the magnetic plate 2 is activated by means of temporary electrical supply whenever a workpiece P is received on the workpiece-holder plate 6 and on the magnetic plate 2 and is to be clamped thereon. Activation of the magnetic plate causes magnetization of the workpiece-holder plate 8 and consequent clamping of the workpiece P. The gap 12 between the facing surfaces of the workpiece-holder plate 8 and of the workpiece P does not jeopardize mutual magnetic clamping, given that it is of a small size. During machining of the workpiece P in a machine tool, the workpiece P is referenced in position in a precise and rigorously determined way so that there exists the certainty that the control system of the machine tool is able to govern the machining operations in an equally precise and determined way. Upon completion of the machining process, the magnetic plate 2 is demagnetized, once again by means of a temporary electrical supply so that the machined workpiece P can be unloaded.

Of course, the invention can be applied with any orientation of the magnetic plate, in particular both with the magnetic plate set horizontally and with the magnetic plate set vertically. In the present description, the terms "top" and "bottom" are used with reference to a horizontal orientation of the magnetic plate, but are not to be interpreted in a limiting sense. For example, in the case of vertical orientation of the magnetic plate, by "top surface" and "bottom surface" of the workpiece-holder plate is meant the opposite surfaces of the workpiece-holder plate that are, respectively, furthest from and closest to the magnetic plate.

Finally, it is evident that, without prejudice to the principle of the invention, the details of construction and the embodiments may vary widely with respect to what is described and illustrated herein purely by way of example, without thereby departing from the scope of the present invention as defined in the annexed claims.

The invention claimed is:

1. A magnetic device for gripping and clamping a workpiece in a machining unit or on a machining line, said device comprising;
    a magnetic plate including a distribution of high-energy permanent-magnet modules, which can be electrically activated, said plate having two plane and opposite main surfaces, giving out onto which are the poles of said permanent-magnet modules;
    an auxiliary workpiece-holder plate, made of ferromagnetic material, having a base surface resting on a main surface of the magnetic plate and a top surface for receiving the workpiece thereon;
    means for precise referencing in position of the workpiece on the auxiliary workpiece-holder plate,
    said referencing means
    comprising at least two locating pins carried by said workpiece-holder plate and having axes orthogonal to said main surface of the magnetic plate, said locating pins being prearranged for being received within seats formed in the workpiece so as to enable a precise referencing of the position of the workpiece with respect to the auxiliary workpiece-holder plate in the plane of the main surface of the magnetic plate, said auxiliary workpiece-holder plate having a top surface shaped in a way complementary to the surface of the workpiece that is to rest thereon; and said top surface of the auxiliary workpiece-holder plate having a plurality of supporting pads for resting of corresponding portions of the bottom surface of the workpiece in such a way that the bottom surface of the workpiece and the top surface of the auxiliary workpiece-holder plate are kept slightly set apart from one another for most of their extension.

2. The magnetic device according to claim 1, further comprising a covering shroud for protection of the magnetic plate, having a metal-sheet structure made of non-ferromagnetic material, with a top wall resting on the main top surface of the magnetic plate and having an opening, the boundary of which follows the perimeter of the base surface of said auxiliary workpiece-holder plate so as to enable said auxiliary workpiece-holder plate to project through said opening.

* * * * *